(12) United States Patent
Barbarek

(10) Patent No.: US 7,908,299 B2
(45) Date of Patent: Mar. 15, 2011

(54) METHOD AND APPARATUS FOR PSEUDO-CONVERSION OF TABLE OBJECTS

(75) Inventor: Wayne Joseph Barbarek, Chicago, IL (US)

(73) Assignee: Computer Associates Think, Inc., Islandia, NY (US)

( * ) Notice: Subject to any disclaimer, the term of this patent is extended or adjusted under 35 U.S.C. 154(b) by 463 days.

(21) Appl. No.: 12/023,069

(22) Filed: Jan. 31, 2008

(65) Prior Publication Data

US 2009/0198715 A1    Aug. 6, 2009

(51) Int. Cl.
  G06F 7/00    (2006.01)
  G06F 17/30    (2006.01)
(52) U.S. Cl. .................. 707/805; 707/825; 715/761
(58) Field of Classification Search ........... 707/999.101, 707/805, 825; 715/762
  See application file for complete search history.

(56) References Cited

U.S. PATENT DOCUMENTS

| | | | | |
|---|---|---|---|---|
| 5,392,390 A | * | 2/1995 | Crozier .................... | 715/751 |
| 5,404,441 A | * | 4/1995 | Satoyama .................... | 715/762 |
| 5,450,581 A | * | 9/1995 | Bergen et al. .................... | 1/1 |
| 5,495,567 A | * | 2/1996 | Iizawa et al. .................... | 715/762 |
| 5,533,184 A | * | 7/1996 | Malcolm .................... | 715/762 |
| 5,550,971 A | * | 8/1996 | Brunner et al. .................... | 1/1 |
| 5,625,815 A | * | 4/1997 | Maier et al. .................... | 1/1 |
| 5,652,874 A | * | 7/1997 | Upson et al. .................... | 716/11 |
| 5,926,806 A | * | 7/1999 | Marshall et al. .................... | 707/752 |
| 6,041,344 A | * | 3/2000 | Bodamer et al. .................... | 709/203 |
| 6,115,704 A | * | 9/2000 | Olson et al. .................... | 1/1 |
| 6,219,670 B1 | * | 4/2001 | Mocek et al. .................... | 707/754 |
| 6,240,428 B1 | * | 5/2001 | Yeung et al. .................... | 1/1 |
| 6,341,280 B1 | * | 1/2002 | Glass et al. .................... | 707/754 |
| 6,434,545 B1 | * | 8/2002 | MacLeod et al. .................... | 1/1 |
| 6,662,193 B1 | * | 12/2003 | Christensen .................... | 707/621 |
| 7,117,229 B2 | * | 10/2006 | Marshall et al. .................... | 1/1 |
| 7,167,873 B2 | * | 1/2007 | Brobst et al. .................... | 707/792 |
| 7,363,315 B2 | * | 4/2008 | Binder et al. .................... | 707/805 |

OTHER PUBLICATIONS

Bruni et al., DB2 UDB for z/OS Version 8 Technical Preview, Apr. 13, 2003, IBM Redbooks,0/7384-2746-2; pp. 1-17.*

* cited by examiner

*Primary Examiner* — Yicun Wu
*Assistant Examiner* — Pavan Mamillapalli
(74) *Attorney, Agent, or Firm* — Michael J. Buchenhorner

(57) ABSTRACT

A method for converting a table object from a first partitioning type to a second partitioning type includes steps or acts of gathering information including a definition of a clustering index of the table object; converting the table object of the first partitioning type into a virtual table object of the second partitioning type by virtually applying the information to a clustering index of the table object such that the virtual table object represents how the table object will appear when it is explicitly converted; and presenting the virtual table object to a user for viewing and manipulating as a table of the second partitioning type before generating an explicit conversion to said second partitioning type.

20 Claims, 37 Drawing Sheets

```
ROPILIM1 ------- Index Partitions Limit Key Values ------- 2007/04/05 13:12:46
COMMAND ===>                                                SCROLL ===> PAGE Enter MIN or MAX for the column and partition that you want to set to MINVALUE
or MAXVALUE. Blank out the entire field to clear MINVALUE/MAXVALUE. Enter a
maintenance mode command to leave MAXVALUES mode. Enter END when you are done.
NOTE: This screen does not check for validity of other values nor omissions.

---------------------------------------------- Maintenance Mode => MAXVALUES
CMND PART RADIATION_LEVEL SAMPLE_COUNT AM_PM
____  1   A                ____         ____
____  2   B                ____         ____
____  3   C                ____         ____
____  4   D                ____         ____
____  5   E                ____         ____
____  6   MAXVALUE         ____         ____
____  7   ____
************************ BOTTOM OF DATA ************************
```

```
ROPIALT ----------------------- CA - Index Alter ---------------------  2007/04/17 12:27:04
COMMAND ===>                                                           SCROLL ===> PAGE Option       => A                          Object   => I      Mode   => O ONLINE
Item Name    => NBIX0014                 > Creator  => DB2    Where  => N
SSID: DB1A   ------------------------------------------------------------BARWAC2
Index Name   => NBIX0014                 > Creator  => DB2  > Comment       =>
Table Name   => NBTB0014                 > Creator  => DB2  > Unique Rule   => YES
Buffer Pool  => BP2                        Cluster  => YES    Close Dataset => NO
Partitioned  => YES (TS Parts: 73)         GBP Cache => CHANGED  Defer Build => NO
Piecesize    =>                            Padded   => DEFAULT  Index Type   => 2
Copy         => NO                                                Define      => YES
CMD SEQ# PS KEY-COLUMN-NAME   ORDER COLTYPE              SRCTYPE  SIZE
___  1      AE_ART_SL         ASC   CHAR                          2
___  2      AE_NR             ASC   CHAR                         11
___  3      KTO_ART_SL        ASC   INTEGER                       4
___  4      WH_SL             ASC   CHAR                          3
___  5      KTO_LNR           ASC   INTEGER                       4
___  6      ANSPR_LNR         DESC  INTEGER                       4
___  7      SATZ_LNR          DESC  INTEGER                       4
*************************** BOTTOM OF DATA ***********************************

EXPLICIT/IMPLICIT----------------------------+
CMD PART VCAT  STOGROUP PRIQTY SECQTY ERASE FRPAGE %FR
___  1         SEANSG8    48     48    NO     0     10
___  2         SEANSG8    48     48    NO     0     10
___  3         SEANSG8    48     48    NO     0     10
___  4         SEANSG8    48     48    NO     0     10
PF7/8: Scroll Key Columns    PF3/END: Process    PF10/11: Scroll Partitions
```

FIG. 1

```
ROPTALT --------------------- CA - Table Alter ---------------------- 2007/04/17  12:30:14
COMMAND ===>                                                          SCROLL ===> PAGE Option       => A                          Object   => T           Mode  => O ONLINE
Item Name    => NBTB0014                   Creator  => DB2         Where => N
SSID: D81A   ------------------------------------------------------------> BARWAC2
Table        => NBTB0014                 > Creator   => >       > Comm/Lab => > Y
Database     => NBDB0003                   Editproc  => >         Data Cap  => > NONE
Tablespace   => NBTSP014                   Validproc => >         OBID      => >
Partitioning => yes (TS Parts: 73)         Audit     => NONE      Volatile  => > N
Table Type   => REGULAR                    Restrict  => >         CCSID     => EBCDIC
Row Size     => 309/-3,739                 Forgn Key => N         Chk Const => > N CMD ### PS COLUMN NAME           COLUMN TYPE    SIZE   N D FORDAT PK UK FK
 __  1     AE_ART_SL              CHAR             2    N   SBCS   1
 __  2     AE_NR                  CHAR            11    N   SBCS   2
 __  3     KTO_ART_SL             INTEGER          4    N          3
 __  4     WH_SL                  CHAR             3    N   SBCS   4
 __  5     KTO_LNR                INTEGER          4    N          5
 __  6     ANSPR_LNR              INTEGER          4    N          6
 __  7     SATZ_LNR               INTEGER          4    N          7
 __  8     UPD_NR                 SMALLINT         2    N
 __  9     SPERR_KZ               CHAR             1    Y   SBCS
 __ 10     GUELT_VON_DAT          DATE             4    N
 __ 11     ERF_PNR                INTEGER          4    Y   SBCS
 __ 12     ESTL_DAT               DATE             4    Y
 __ 13     RW_BUCH_GRD_SL         CHAR             3    Y   SBCS
 __ 14     BUCH_ART_SL            CHAR             5    Y   SBCS
 __ 15     UMRECHN_KURS           DECIMAL      15,11    Y
```

FIG. 2

```
ROPTALT ------------------- CA - Table Alter ------------- 2007/04/17  12:34:13
COMMAND ===>                                                      SCROLL ===> PAGE
RO435W Your table will be converted to use TCP instead of ICP.
Option     => A                           Object   => T        Mode   => O ONLINE
Item Name  => NBTB0014                  > Creator  => DB2     > Where  => N
SSID: D81A --------------------------------------------------------- BARWAC2 ----->
Table      => NBTB0014                  > Creator  => DB2     > Comm/Lab => Y
Database   => NBDB0003                    Editproc =>          Data Cap  => NONE
Tablespace => NBTSP014                    Validproc =>         OBID      =>
Partitioning => YES (TS Parts: 73)        Audit    => NONE     Volatile  => N
Table Type => REGULAR                     Restrict =>          CCSID     => EBCDIC
Row Size   => 309/-3,739                  Forgn Key => N       Chk Const => N CMD ### PS COLUMN NAME        COLUMN TYPE   SIZE   N  D  FORDAT  PK  UK  FK
 __  1  1 AE_ART_SL           CHAR            2    N     SBCS    1
 __  2  2 AE_NR               CHAR           11    N     SBCS    2
 __  3  3 KTO_ART_SL          INTEGER         4    N             3
 __  4  4 WH_SL               CHAR            3    N     SBCS    4
 __  5  5 KTO_LNR             INTEGER         4    N             5
 __  6  6 ANSPR_LNR           INTEGER         4    N             6
 __  7  7 SATZ_LNR            INTEGER         4    N             7
 __  8    UPD_NR              SMALLINT        2    N
 __  9    SPERR_KZ            CHAR            1    N     SBCS
 __ 10    GUELT_VON_DAT       DATE            4    N
 __ 11    ERF_PNR             INTEGER         4    N
 __ 12    ESTL_DAT            DATE            4    Y
 __ 13    RW_BUCH_GRD_SL      CHAR            3    Y     SBCS
 __ 14    BUCH_ART_SL         CHAR            5    Y     SBCS
 __ 15    UMRECHN_KURS        DECIMAL      15,11   Y
```

FIG. 3

```
ROPTCOL1 -- Table Partitioning Key Col Selection & Maint -- 2007/04/17 12:36:22
COMMAND ===>                                                      SCROLL ===> PAGE Select the columns you wish to insert by placing an s beside the column name.
You may optionally specify a block of columns by appending a number after
the S or by using the SS block command. Press HELP for more information.

Column Name Selection ----------------------------- Unused Cols List - Hide ==> y
CMD COL# Column Name              COLTYPE    SRCTYPE  SIZE    SRCTYPE  SIZE
____  8  UPD_NR                   SMALLINT                     2              N
____  9  SPERR_KZ                 CHAR                         1              N
____ 10  GUELT_VON_DAT            DATE                         4              N
____ 11  ERF_PNR                  INTEGER                      4              N
____ 12  ESTL_DAT                 DATE                         4              N
____ 13  RW_BUCH_GRD_SL           CHAR                         3              N
____ 14  BUCH_ART_SL              CHAR                         5              N
____ 15  UMRECHN_KURS             DECIMAL                     15,11           N
____ 16  BUCH_BETR                DECIMAL                     15,2            N
____ 17  BUCH_DAT                 DATE                         4              N
____ 18  BEL_LNR                  INTEGER                      4              N
____ 19  SOLL_HB_SL               CHAR                         1              N
____ 20  SAM_LNR                  INTEGER                      4              N
____ 21  GELD_EING_KTO_LNR        INTEGER                      4              N
____ 22  GELD_VERWE_BEL_NR        INTEGER                      4              N
____ 23  KTO_AUSZUG_NR            INTEGER                      4              N
____ 24  UMB_KTO                  CHAR                        70              N
____ 25  UMB_AE_TYP_SL            CHAR                         6              N
____ 26  ANW_KL_SL                CHAR                         2              N
____ 27  ANW_KL_LNR               SMALLINT                     2              N
____ 28  BUCH_TXT                 CHAR                        60              N
____ 29  GES_SL                   CHAR                         4              N
____ 30  AUFT_NR                  SMALLINT                     2              N
____ 31  VORG_PRFX                CHAR                         2              N Arrange the columns in the key and set the ORDER of each column to either ASC
(ascending) or DESC (descending). Press PF3 when you are finished.

Table Partitioning Key ------------------------------------------------------
CMD SEQ# KEY-COLUMN-NAME          ORDER  COLTYPE    SRCTYPE  SIZE
____  1  AE_ART_SL                ASC    CHAR
____  2  AE_NR                    ASC    CHAR
____  3  KTO_ART_SL                ASC    INTEGER
                                         PF3/END: Process PF7/8: Scroll Column Names               PF10/11: Scroll Table Keys
```

FIG. 4

```
ROPTCOL3  - Table Partitioning Key Col Selection & Maint  --  2007/04/17 12:37:05
COMMAND ===>                                                        SCROLL ===> PAGE Column Name Selection ----------------------- Unused Cols List - Hide --> Y Arrange the columns in the key and set the ORDER of each column to either ASC
(ascending) or DESC (descending).  Press PF3 when you are finished.

Table Partitioning Key ------------------
CMD SEQ# KEY-COLUMN-NAME    ORDER  COLTYPE    SRCTYPE   SIZE
___   1  AE_ART_SL          ASC    CHAR                   2   N
___   2  AE_NR              ASC    CHAR                  11   N
___   3  KTO_ART_SL         ASC    INTEGER                4   N
___   4  WH_SL              ASC    CHAR                   3   N
___   5  KTO_LNR            ASC    INTEGER                4   N
___   6  ANSPR_LNR          DESC   INTEGER                4   N
___   7  SATZ_LNR           DESC   INTEGER                4   N
****************************** BOTTOM OF DATA ******************************
```

FIG. 5

```
ROPTLIM1 -----  Table Partitioning & Limit Key Values  -----  2007/04/17  12:35:23
COMMAND ===>                                                       SCROLL ===> PAGE
RO331I String delimiters (< >) have been inserted.
Modify your Partitioning and Limit Key Values. A constant must be present for
the first key column of each partition. Unspecified columns will be def-
aulted by DB2. Enter END after you have completed your changes.

---------------------------------- Maintenance Mode => PARTITIONS ----------
CMND PART AE_ART_SL AE_NR       KTO_ART_SL  WH_SL KTO_LNR   ANSPR_LNR   SAT
---- ---- --------- ----------- ----------  ----- -------   ---------   ---
      1   GV       <000000100 >   552
      2   GZ       <000000100 >  5000
      3   IV       <000000401 >   552
      4   IV       <000000446 >  5005
      5   IV       <000000501 >  1510
      6   IV       <000000634 >   552
      7   IV       <000000702 >   526
      8   IV       <000000705 >   552
      9   IV       <000000706 >   524
     10   IV       <000000709 >   526
     11   IV       <000000710 >  1510
     12   IV       <000000711 >  1511
     13   IV       <000000712 >  1509
     14   IV       <000000712 >  1510
     15   IV
     16   IV
```

FIG. 6

```
ROPTLIM1  -----  Table Partitioning & Limit Key Values  -----  2007/04/17  12:39:35
COMMAND ===> rotate                                                    SCROLL ===> PAGE
RO3311 String delimiters (< >) have been inserted.
Modify your Partitioning and Limit Key Values. A constant must be present for
the first key column of each partition. Unspecified columns will be def-
aulted by DB2. Enter END after you have completed your changes.
```

|  |  |  |  |  | Maintenance Mode => | PARTITIONS |  |
|---|---|---|---|---|---|---|---|
| CMND | PART | AE_ART_SL | AE_NR | KTO_ART_SL | WH_SL  KTO_LNR | ANSPR_LNR | SAT |
|  | 1 | GV |  |  |  |  |  |
|  | 2 | GZ |  |  |  |  |  |
|  | 3 | IV | <000000100 | 552 |  |  |  |
|  | 4 | IV | <000000100 | 5000 |  |  |  |
|  | 5 | IV | <000000401 | 552 |  |  |  |
|  | 6 | IV | <000000446 | 5005 |  |  |  |
|  | 7 | IV | <000000501 | 1510 |  |  |  |
|  | 8 | IV | <000000634 | 552 |  |  |  |
|  | 9 | IV | <000000702 | 526 |  |  |  |
|  | 10 | IV | <000000705 | 552 |  |  |  |
|  | 11 | IV | <000000706 | 524 |  |  |  |
|  | 12 | IV | <000000709 | 526 |  |  |  |
|  | 13 | IV | <000000710 | 1510 |  |  |  |
|  | 14 | IV | <000000711 | 1511 |  |  |  |
|  | 15 | IV | <000000712 | 1509 |  |  |  |
|  | 16 | IV | <000000712 | 1510 |  |  |  |
|  | 17 | IV | <000000715 | 524 |  |  |  |
|  | 18 | IV | <000000774 | 5046 |  |  |  |
|  | 19 | IV | <000010412 | 5024 |  |  |  |

FIG. 7

```
ROPTLIMI -----   Table Partitioning & Limit Key Values   ---- 2007/04/17 12:40:08
COMMAND ===>                                                  SCROLL ===> PAGE Rotating first logical partition to be last logical partition for table with
ASCENDING keys. Enter a key value for the NEW last partition that is higher
than all other partitioning keys. Press ENTER to save your changes.

------------------------------- Maintenance Mode => PARTITIONS --------------
CMND PART AE_ART_SL AE_NR        KTO_ART_SL WH_SL KTO_LNR  ANSPR_LNR  SAT
     59   IZ        <000022566 >      740   EUR      400   _____   ___
     60   IZ        <000022566 >      740   EUR      500   _____   ___
     61   IZ        <000022566 >      740   EUR      600   _____   ___
     62   IZ        <000022566 >      740   EUR      700   _____   ___
     63   IZ        <000022566 >      740   EUR      800   _____   ___
     64   IZ        <000022566 >      740   EUR   _____   _____   ___
     65   IZ        <000022566 >      743   ___   _____   _____   ___
     66   IZ        <000022567 >      528   ___   _____   _____   ___
     67   IZ        <000030156 >     5026   ___   _____   _____   ___
     68   IZ        <000031195 >     5026   ___   _____   _____   ___
     69   IZ        <000031202 >     5026   ___   _____   _____   ___
     70   IZ        _____       5026   ___   _____   _____   ___
     71   IZ        _____      _____   ___   _____   _____   ___
     72   X'FF'
     73
smaf ******************************** BOTTOM OF DATA ***********************
***************************************************************************
```

FIG. 8

```
ROPTLIM1 ------ Table Partitioning & Limit Key Values ------ 2007/04/17  12:42:07
COMMAND ===> compare                                          SCROLL ===> PAGE Modify your partitioning and limit key values. A constant must be present for
the first key column of each partition. Unspecified columns will be def-
aulted by DB2. Enter END after you have completed your changes.

Maintenance Mode => PARTITIONS
CMND PART AE_ART_SL AE_NR      KTO_ART_SL WH_SL KTO_LNR     ANSPR_LNR      SAT
---- ---- --------- ----------- ---------- ----- ------- ---------------- ----
       63 IZ        <000022566       740  EUR       800 _____ ____
       64 IZ        <000022566       740  EUR     _____ _____ ____
       65 IZ        <000022566       743  ___   _____ _____ ____
       66 IZ        <000022567      5026  ___   _____ _____ ____
       67 IZ        <000030156       528  ___   _____ _____ ____
       68 IZ        <000031195      5026  ___   _____ _____ ____
       69 IZ        <000031202      5026  ___   _____ _____ ____
       70 IZ        _____     5026  ___   _____ _____ ____
       71 IZ        _____    _____ ___   _____ _____ ____
       72 X'FF'
       73 MAXVALUE
******************************* BOTTOM OF DATA ********************************
```

FIG. 9

```
ROPTLIM1 ------ Table Partitioning & Limit Key Values  ----- 2007/04/17 12:42:49
COMMAND ===>                                                   SCROLL ===> PAGE Modify your Partitioning and limit Key Values. A constant must be present for
the first key column of each partition. Unspecified columns will be def-
aulted by DB2. Enter END after you have completed your changes.

Maintenance Mode => PARTITIONS
CMND PART AE_ART_SL AE_NR          KTO_ART_SL   WH_SL KTO_LNR  ANSPR_LNR   SAT
---- ---- --------- --------------- ---------- ----- -------- ---------- ----
OLD   69  IZ        <000031195  >   5026        ____  _____ _____ ____
      70  IZ        <000031195  >   5026        ____  _____ _____ ____
OLD   70  IZ        <000031202  >   5026        ____  _____ _____ ____
      71  IZ        <000031202  >   5026        ____  _____ _____ ____
OLD   71  IZ                                    ____  _____ _____ ____
      72  IZ                                    ____  _____ _____ ____
OLD   72  X'FF'                                 ____  _____ _____ ____
      73  X'FF'                                 ____  _____ _____ ____
OLD   73  MAXVALUE                              ____  _____ _____ ____
       1  GV
******************************** BOTTOM OF DATA ********************************
```

FIG. 10

```
ROPTLIM1 ------ Table Partitioning & Limit Key Values  ---- 2007/04/17 12:45:27
COMMAND  ===>                                                  SCROLL ===> PAGE Modify your Partitioning and Limit Key Values. A constant must be present for
the first key column of each partition. Unspecified columns will be def-
aulted by DB2. Enter END after you have completed your changes.

Maintenance Mode =>   PARTITIONS
CMND PART AE_ART_SL AE_NR         KTO_ART_SL WH_SL KTO_LNR       ANSPR_LNR   SAT
     63   IZ       <000022566 ^      740     EUR                   700      ____
     64   IZ       <000022566 ^      740     EUR                   800      ____
     65   IZ       <000022566 ^      740     EUR       _____     ____     ____
     66   IZ       <000022566 ^      743     ___       _____     ____     ____
     67   IZ       <000022567 ^      5026    ___       _____     ____     ____
     68   IZ       <000030156 ^      528     ___       _____     ____     ____
     69   IZ       <000031195 ^      5026    ___       _____     ____     ____
     70   IZ       <000031202 ^      5026    ___       _____     ____     ____
     71   IZ       _____         5026    ___       _____     ____     ____
     72   IZ       _____         ____    ___       _____     ____     ____
     73   X'FF'
******************************** BOTTOM OF DATA *******************************
```

FIG. 11

```
ROPTLIM1 ------ Table Partitioning & Limit Key Values ---- 2007/04/18 14:49:16
COMMAND ===>                                                   SCROLL ===> PAGE Modify your Partitioning and Limit Key Values. A constant must be present for
the first key column of each partition. Unspecified columns will be def-
aulted by DB2. Enter END after you have completed your changes.

Maintenance Mode => PARTITIONS
CMND PART AE_ART_SL AE_NR        KTO_ART_SL WH_SL KTO_LNR     ANSPR_LNR   SAT
____ 63   IZ       <000022566 >       740   EUR      700      _____  ___
____ 64   IZ       <000022566 >       740   EUR      800      _____  ___
____ 65   IZ       <000022566 >       740   EUR      ___      _____  ___
____ 66   IZ       <000022566 >       743   EUR      ___      _____  ___
____ 67   IZ       <000022567 >      5026   ___      ___      _____  ___
____ 68   IZ       <000030156 >       528   ___      ___      _____  ___
____ 69   IZ       <000031195 >      5026   ___      ___      _____  ___
____ 70   IZ       <000031202 >      5026   ___      ___      _____  ___
____ 71   IZ       <_____ >      5026   ___      ___      _____  ___
____ 72   IZ       <_____ >      ____   ___      ___      _____  ___
____ 73   X'FF'
____ 74
******************************** BOTTOM OF DATA ********************************
```

FIG. 12

```
ROPTLIM1  -----  Table Partitioning & Limit Key Values  ----  2007/04/17  12:46:33
COMMAND  ===>                                                      SCROLL ===> PAGE Modify your Partitioning and Limit Key Values. A constant must be present for
the first key column of each partition. Unspecified columns will be def-
auited by DB2. Enter END after you have completed your changes.

Maintenance Mode =>   PARTITIONS
CMND PART AE_ART_SL AE_NR         KTO_ART_SL  WH_SL KTO_LNR       ANSPR_LNR  SAT
      63  IZ       <0000225566>         740  EUR       700        _____  ___
      64  IZ       <0000225566>         740  EUR       800        _____  ___
      65  IZ       <0000225566>         740  EUR       ___        _____  ___
      66  IZ       <0000225566>         743  EUR       ___        _____  ___
      67  IZ       <0000225566>        5026  ___       ___        _____  ___
      68  IZ       <0000225567>         528  ___       ___        _____  ___
      69  IZ       <0000030156>        5026  ___       ___        _____  ___
      70  IZ       <0000031195>        5026  ___       ___        _____  ___
      71  IZ       <0000031202>        5026  ___       ___        _____  ___
      72  IZ       _____          ____  ___       ___        _____  ___
      73  X'FF'    _____          ____  ___       ___        _____  ___
      74  MAXVALUE _____          ____  ___       ___        _____  ___
******************************** BOTTOM OF DATA ********************************
********************************************************************************
```

FIG. 13

DOPILIM1 ----- Index Partitions Limit Key Values ----- 2007/04/05 13:10:20
COMMAND ===)                                             SCROLL ===) PAGE Modify your limit Key Values. A constant must be present for the first index
Key column of each partition. Unspecified columns will be defaulted by DB2.
Enter END after you have completed your changes.

CMND PART RADIATION LEVEL SAMPLE COUNT AM PM
  1    A
  2    B
  3    C
  4    D
  5    E
  6    MAXVALUE
  7    MAXVALUE

FIG. 15

```
CREATE INDEX PDWJB.CHARTX ON PDWJB.CHARTX
    ( RADIATION_LEVEL ASC, SAMPLE_COUNT ASC, AM_PM ASC )
     PARTITIONED USING STOGROUP SYSDEFLT CLUSTER
     PARTITION BY RANGE
     (PARTITION 1 ENDING AT ( 'A' ) ,
      PARTITION 2 ENDING AT ( 'B' ) ,
      PARTITION 3 ENDING AT ( 'C' ) ,
      PARTITION 4 ENDING AT ( 'D' ) ,
      PARTITION 5 ENDING AT ( 'E' ) ,
      PARTITION 6 ENDING AT ( 'MAXVALUE' ) ,
      PARTITION 7 ENDING AT ( 'MAXVALUE' ) );
```

FIG. 16

```
CREATE INDEX PDWJB.CHARTX ON PDWJB.CHARTX
    ( RADIATION_LEVEL ASC, SAMPLE_COUNT ASC, AM_PM ASC )
     PARTITIONED USING STOGROUP SYSDEFLT CLUSTER
     PARTITION BY RANGE
     (PARTITION 1 ENDING AT ( 'A' ) ,
      PARTITION 2 ENDING AT ( 'B' ) ,
      PARTITION 3 ENDING AT ( 'C' ) ,
      PARTITION 4 ENDING AT ( 'D' ) ,
      PARTITION 5 ENDING AT ( 'E' ) ,
      PARTITION 6 ENDING AT ( 'MAXVALUE' ) ,
      PARTITION 7 ENDING AT ( MAXVALUE ) );
```

FIG. 17

```
ROPILIM1 ------- Index Partitions Limit Key Values ------- 2007/04/05 13:13:51
COMMAND ===> maxvalues                                         SCROLL ===> PAGE Modify your Limit Key Values. A constant must be present for the first index
 key column of each partition. Unspecified columns will be defaulted by DB2.
 Enter END after you have completed your changes.

---------------------------------------------- Maintenance Mode => VALUES ONLY
CMND PART RADIATION_LEVEL SAMPLE_COUNT AM_PM
____  1   A               _____ _
____  2   B               _____ _
____  3   C               _____ _
____  4   D               _____ _
____  5   E               _____ _
____  6   MAXVALUE        _____ _
____  7   _____    _____ _
****************************** BOTTOM OF DATA ********************************
```

Fig. 18

```
ROPILIM1 ------- Index Partitions Limit Key Values ------- 2007/04/05 13:12:46
COMMAND ===>                                                    SCROLL ===> PAGE Enter MIN or MAX for the column and partition that you want to set to MINVALUE
 or MAXVALUE.  Blank out the entire field to clear MINVALUE/MAXVALUE.  Enter a
 maintenance mode command to leave MAXVALUES mode. Enter END when you are done.
 NOTE: This screen does not check for validity of other values nor omissions.

------------------------------------------------- Maintenance Mode => MAXVALUES
CMND PART RADIATION_LEVEL SAMPLE_COUNT AM_PM
____  1   A               ____         ____
____  2   B               ____         ____
____  3   C               ____         ____
____  4   D               ____         ____
____  5   E               ____         ____
____  6   MAXVALUE        ____         ____
____  7   ___             ____         ____
xxxxxxxxxxxxxxxxxxxxxxxxxxxx BOTTOM OF DATA xxxxxxxxxxxxxxxxxxxxxxxxxxxxxxxx
```

Fig. 19

```
ROPILIM1 ------- Index Partitions Limit Key Values ------- 2007/04/05 13:14:16
COMMAND ===>                                                    SCROLL ===> PAGE Enter MIN or MAX for the column and partition that you want to set to MINVALUE
or MAXVALUE. Blank out the entire field to clear MINVALUE/MAXVALUE. Enter a
maintenance mode command to leave MAXVALUES mode. Enter END when you are done.
NOTE: This screen does not check for validity of other values nor omissions.

------------------------------------------ Maintenance Mode => MAXVALUES
CMND PART RADIATION_LEVEL SAMPLE_COUNT AM_PM
 ___  1   A                ___          ___
 ___  2   B                ___          ___
 ___  3   C                ___          ___
 ___  4   D                ___          ___
 ___  5   E                ___          ___
 ___  6   MAXVALUE         ___          ___
 ___  7   max              ___          ___
****************************** BOTTOM OF DATA ******************************
```

Fig. 20

```
ROPILIM1 ------- Index Partitions Limit Key Values ------- 2007/04/05 13:14:44
COMMAND ===>                                                    SCROLL ===> PAGE Enter MIN or MAX for the column and partition that you want to set to MINVALUE
 or MAXVALUE.  Blank out the entire field to clear MINVALUE/MAXVALUE.  Enter a
 maintenance mode command to leave MAXVALUES mode. Enter END when you are done.
 NOTE: This screen does not check for validity of other values nor omissions.

------------------------------------------------ Maintenance Mode => MAXVALUES
CMND PART RADIATION_LEVEL SAMPLE_COUNT AM_PM
____ 1    A               ____         ____
____ 2    B               ____         ____
____ 3    C               ____         ____
____ 4    D               ____         ____
____ 5    E               ____         ____
____ 6    MAXVALUE        ____         ____
____ 7    MAXVALUE        ____         ____
****************************** BOTTOM OF DATA *********************************
```

Fig. 21

```
ROPILIM1 ------- Index Partitions Limit Key Values ------- 2007/04/05 13:14:44
COMMAND ===>                                                    SCROLL ===> PAGE Enter MIN or MAX for the column and partition that you want to set to MINVALUE
or MAXVALUE.  Blank out the entire field to clear MINVALUE/MAXVALUE.  Enter a
maintenance mode command to leave MAXVALUES mode. Enter END when you are done.
NOTE: This screen does not check for validity of other values nor omissions.

---------------------------------------------- Maintenance Mode => MAXVALUES
CMND PART RADIATION_LEVEL SAMPLE_COUNT AM_PM
____  1   A               ____         ____
____  2   B               ____         ____
____  3   C               ____         ____
____  4   D               ____         ____
____  5   E               ____         ____
____  6   MAXVALUE        ____         ____
____  7   MAXVALUE        max          max
***************************** BOTTOM OF DATA ******************************
```

Fig. 22

```
ROPILIM1 -------- Index Partitions Limit Key Values -------- 2007/04/05 13:16:25
COMMAND ===>                                                  SCROLL ===> PAGE Enter MIN or MAX for the column and partition that you want to set to MINVALUE
or MAXVALUE.  Blank out the entire field to clear MINVALUE/MAXVALUE.  Enter a
maintenance mode command to leave MAXVALUES mode. Enter END when you are done.
NOTE: This screen does not check for validity of other values nor omissions.

------------------------------------------------- Maintenance Mode => MAXVALUES
CMND PART RADIATION_LEVEL SAMPLE_COUNT AM_PM
____  1   A               ____         ____
____  2   B               ____         ____
____  3   C               ____         ____
____  4   D               ____         ____
____  5   E               ____         ____
____  6   MAXVALUE        ____         ____
____  7   MAXVALUE        MAXVALUE     MAXVALUE
xxxxxxxxxxxxxxxxxxxxxxxxxxxxxx BOTTOM OF DATA xxxxxxxxxxxxxxxxxxxxxxxxxxxxxx
```

Fig. 23

```
ROPILIM1 -------- Index Partitions Limit Key Values -------- 2007/04/05 13:16:25
COMMAND ===> values                                          SCROLL ===> PAGE Enter MIN or MAX for the column and partition that you want to set to MINVALUE
or MAXVALUE.  Blank out the entire field to clear MINVALUE/MAXVALUE.  Enter a
maintenance mode command to leave MAXVALUES mode. Enter END when you are done.
NOTE: This screen does not check for validity of other values nor omissions.

------------------------------------------ Maintenance Mode => MAXVALUES
CMND PART RADIATION_LEVEL SAMPLE_COUNT AM_PM
____  1   A               ____         ____
____  2   B               ____         ____
____  3   C               ____         ____
____  4   D               ____         ____
____  5   E               ____         ____
____  6   MAXVALUE        ____         ____
____  7   MAXVALUE        MAXVALUE     MAXVALUE
******************************* BOTTOM OF DATA ********************************
```

Fig. 24

```
ROPILIM1 ------- Index Partitions Limit Key Values ------- 2007/04/05 13:18:35
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A                              _
____  2   B                              _
____  3   C                              _
____  4   D                              _
____  5   E                              _
____  6   MAXVALUE                       _
____  7   MAXVALUE        MAXVALUE       MAXVALUE
******************************* BOTTOM OF DATA ********************************
```

Fig. 25

```
ROPILIM1 ------- Index Partitions Limit Key Values ------- 2007/04/05 13:18:35
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A                _____ _
____  2   B                _____ _
____  3   C                _____ _
____  4   D                _____ _
____  5   E                _____ _
____  6   MAXVALUE         _____ _
cmax  7   MAXVALUE         MAXVALUE      MAXVALUE
xxxxxxxxxxxxxxxxxxxxxxxxxxxxx BOTTOM OF DATA xxxxxxxxxxxxxxxxxxxxxxxxxxxxxx
```

Fig. 26

```
ROPILIM1 ------- Index Partitions Limit Key Values ------- 2007/04/05 13:20:56
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A               _____ _
____  2   B               _____ _
____  3   C               _____ _
____  4   D               _____ _
____  5   E               _____ _
____  6   MAXVALUE        _____ _
____  7   _____    _____ _
****************************** BOTTOM OF DATA ********************************
```

Fig. 27

```
ROPILIM1 ------- Index Partitions Limit Key Values ------- 2007/04/05 13:20:56
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A                _____ _
____  2   B                _____ _
____  3   C                _____ _
____  4   D                _____ _
____  5   E                _____ _
____  6   MAXVALUE         _____ _
smax  7   _____     _____ _
****************************** BOTTOM OF DATA **********************************
```

Fig. 28

```
ROPILIM1 ------- Index Partitions Limit Key Values ------- 2007/04/05 13:21:40
COMMAND ===>                                                  SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A                            _
____  2   B                            _
____  3   C                            _
____  4   D                            _
____  5   E                            _
____  6   MAXVALUE                     _
____  7   MAXVALUE        MAXVALUE     MAXVALUE
xxxxxxxxxxxxxxxxxxxxxxxxxxxxxx BOTTOM OF DATA xxxxxxxxxxxxxxxxxxxxxxxxxxxxxxxx
```

Fig. 29

```
ROPILIM1 ------- Index Partitions Limit Key Values ------- 2007/04/05 13:58:54
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL  SAMPLE_COUNT  AM_PM
____  1   A                MAXVALUE      MAXVALUE
____  2   B                MAXVALUE      MAXVALUE
____  3   C                MAXVALUE      MAXVALUE
____  4   D                MAXVALUE      MAXVALUE
____  5   E                MAXVALUE      MAXVALUE
cmax  6   MAXVALUE         MAXVALUE      MAXVALUE
____  7   MAXVALUE         MAXVALUE      MAXVALUE
************************************ BOTTOM OF DATA ****************************
```

Fig. 30

```
ROPILIM1 ------- Index Partitions Limit Key Values ------- 2007/04/05 14:01:20
COMMAND ===>                                                  SCROLL ===> PAGE Modify your Limit Key Values. A constant must be present for the first index
 key column of each partition. Unspecified columns will be defaulted by DB2.
 Enter END after you have completed your changes.

------------------------------------------- Maintenance Mode => VALUES ONLY
CMND PART RADIATION_LEVEL SAMPLE_COUNT AM_PM
____ 1    A               MAXVALUE     MAXVALUE
____ 2    B               MAXVALUE     MAXVALUE
____ 3    C               MAXVALUE     MAXVALUE
____ 4    D               MAXVALUE     MAXVALUE
____ 5    E               MAXVALUE     MAXVALUE
____ 6    MAXVALUE        _____     _
____ 7    MAXVALUE        MAXVALUE     MAXVALUE
************************** BOTTOM OF DATA *******************************
```

Fig. 31

```
ROPILIM1 ------- Index Partitions Limit Key Values ------- 2007/04/05 13:21:40
COMMAND ===> smax sample_count,am_pm                              SCROLL ===> PAGE Modify your Limit Key Values. A constant must be present for the first index
 key column of each partition. Unspecified columns will be defaulted by DB2.
 Enter END after you have completed your changes.

------------------------------------------------- Maintenance Mode => VALUES ONLY
CMND PART RADIATION_LEVEL SAMPLE_COUNT AM_PM
____  1   A               _____ _
____  2   B               _____ _
____  3   C               _____ _
____  4   D               _____ _
____  5   E               _____ _
____  6   MAXVALUE        _____ _
____  7   MAXVALUE        MAXVALUE     MAXVALUE
xxxxxxxxxxxxxxxxxxxxxxxxxxx BOTTOM OF DATA xxxxxxxxxxxxxxxxxxxxxxxxxxx
```

Fig. 32

```
ROPILIM1 ------- Index Partitions Limit Key Values ------- 2007/04/05 13:58:54
COMMAND ===>                                                      SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A               MAXVALUE     MAXVALUE
____  2   B               MAXVALUE     MAXVALUE
____  3   C               MAXVALUE     MAXVALUE
____  4   D               MAXVALUE     MAXVALUE
____  5   E               MAXVALUE     MAXVALUE
____  6   MAXVALUE        MAXVALUE     MAXVALUE
____  7   MAXVALUE        MAXVALUE     MAXVALUE
**************************** BOTTOM OF DATA ************************************
```

Fig. 33

```
ROPILIM1 ------- Index Partitions Limit Key Values ------- 2007/04/05 14:01:20
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A               MAXVALUE     MAXVALUE
____  2   B               MAXVALUE     MAXVALUE
____  3   C               MAXVALUE     MAXVALUE
____  4   D               MAXVALUE     MAXVALUE
____  5   E               MAXVALUE     MAXVALUE
____  6   MAXVALUE        _____   _
pro_  7   MAXVALUE        MAXVALUE     MAXVALUE
******************************** BOTTOM OF DATA ********************************
```

Fig. 34

```
ROPILIM1 ------- Index Partitions Limit Key Values ------- 2007/04/05 14:02:13
COMMAND ===>                                                    SCROLL ===> PAGE Modify your Limit Key Values. A constant must be present for the first index
 key column of each partition. Unspecified columns will be defaulted by DB2.
 Enter END after you have completed your changes.

--------------------------------------------- Maintenance Mode => VALUES ONLY
CMND PART RADIATION_LEVEL SAMPLE_COUNT AM_PM
____  1   A               MAXVALUE     MAXVALUE
____  2   B               MAXVALUE     MAXVALUE
____  3   C               MAXVALUE     MAXVALUE
____  4   D               MAXVALUE     MAXVALUE
____  5   E               MAXVALUE     MAXVALUE
____  6   MAXVALUE        _____     _
____  7   MAXVALUE        MAXVALUE     MAXVALUE
*************************** BOTTOM OF DATA ****************************
```

Fig. 35

```
ROPILIM1 ------- Index Partitions Limit Key Values ------- 2007/04/05 14:02:13
COMMAND ===> cmax *                                         SCROLL ===> PAGE Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A               MAXVALUE     MAXVALUE
____  2   B               MAXVALUE     MAXVALUE
____  3   C               MAXVALUE     MAXVALUE
____  4   D               MAXVALUE     MAXVALUE
____  5   E               MAXVALUE     MAXVALUE
____  6   MAXVALUE
____  7   MAXVALUE        MAXVALUE     MAXVALUE
******************************* BOTTOM OF DATA ******************************
```

Fig. 36

```
ROPILIM1 ------- Index Partitions Limit Key Values ------- 2007/04/05 14:02:47
COMMAND ===>                                                    SCROLL ===> PAGE
R0290W One or more limit values were not altered because they are protected.
Modify your Limit Key Values. A constant must be present for the first index
 key column of each partition. Unspecified columns will be defaulted by DB2.
 Enter END after you have completed your changes.

------------------------------------------------ Maintenance Mode => VALUES ONLY
CMND PART RADIATION_LEVEL SAMPLE_COUNT AM_PM
____  1   A               _____   _
____  2   B               _____   _
____  3   C               _____   _
____  4   D               _____   _
____  5   E               _____   _
____  6   MAXVALUE        _____   _
____  7   MAXVALUE        MAXVALUE     MAXVALUE
****************************** BOTTOM OF DATA *********************************
```

Fig. 37

METHOD AND APPARATUS FOR PSEUDO-CONVERSION OF TABLE OBJECTS

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of database technology, and more particularly relates to the field of DB2 table objects.

BACKGROUND OF THE INVENTION

With the advent of IBM's DB2® Version 8 data management system, it became necessary for the Unicenter DB2 products to support Table-Controlled Partitioning (TCP) as apposed to index-controlled partitioning (ICP). As part of this new technology, DB2 Version 8 provided a means of causing a table object to be implicitly converted to use table-controlled partitioning instead of index-controlled partitioning using a number of methods.

Method 1: Dropping the partitioning index

Method 2: Altering the partitioning index to be not clustered (see "CLUSTER and NOT CLUSTER" below)

Method 3: Creating a data-partitioned secondary index (DPSI)

Method 4: Creating an index with the VALUES clause, but without the CLUSTER keyword Method 5: Altering a partition using ALTER TABLE ALTER PART n Method 6: Rotating partitions using ALTER TABLE ALTER PART ROTATE Method 7: Adding a partition using ALTER TABLE ADD PART The first four methods provide a means of causing an implicit conversion by applying alterations to the table object indirectly—via a direct alteration to the table's clustering index. The last three methods (5 through 7) provide a means of causing the table to be implicitly converted to use TCP instead of ICP by applying alterations directly to the table object instead. Although the table may be implicitly converted to use TCP using methods 5 through 7, the limit values, key columns, etc. are attributes of the table's clustering index and not explicit attributes of the table object; and, therefore not readily nor conveniently available by inspecting the table object alone, but rather requires the manual lookup of the table's clustering index in the DB2 catalog and viewing the clustering index's definition before it can be determined what specific ALTER TABLE statements and syntactical clauses are required so that a partition may be successfully added (5), rotated (6) or altered (7) while at the same time causing the table to be implicitly converted to use TCP instead of ICP.

Further, when working with such table objects using interactive means, it should be an intuitive straightforward and convenient process for the user to view and manage the information (partitioning information and all attributes, including key sequence numbers, ascending/descending attributes, ending values, etc. not yet part of the table definition) inherited from the table's clustering index as it will appear before committing changes and generating the DDL (Data Definition Language) statements that will, when executed, cause the actual implicit conversion to take place without having to juggle two different objects—index and table objects—or require the explicit conversion to actually occur to the table object before being able to view and/or manage the object as a TCP table.

SUMMARY OF THE INVENTION

Briefly, according to an embodiment of the invention a method for converting a table object from a first partitioning type to a second partitioning type includes steps or acts of: gathering information including a definition of a clustering index of the table object; converting the table object of the first partitioning type into a virtual table object of the second partitioning type by virtually applying the information to a clustering index of the table object such that the virtual table object represents how the table object will appear when it is explicitly converted; and presenting the virtual table object to a user for viewing and manipulating as a table of the second partitioning type before generating an explicit conversion to said second partitioning type. According to a preferred embodiment of the present invention, the first partitioning type is index-controlled partitioning and the second partitioning type is table-controlled partitioning.

According to another embodiment of the present invention, a computer program product includes code for causing a computer to convert a table object from a first partitioning type to a second partitioning type by performing the method steps as described above.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1 is a screen shot of a clustering index using ICP partitioning, according to the known art;

FIG. 2 is a screen shot of the FIG. 1 index table object;

FIG. 3 is a screen shot of the pseudo-converted table object of FIG. 2;

FIG. 4 is a screen shot displayed after entering the KEY primary command to generate a pseudo-conversion from ICP to TCP;

FIG. 5 shows the same screen with the Hide option set to Y;

FIG. 6 shows the screen of FIG. 2 after entering the LIMITS primary command;

FIG. 7 shows the ROTATE command;

FIG. 8 shows the screen after the ROTATE command is executed;

FIG. 9 shows the COMPARE command being entered;

FIG. 10 shows the screen after the COMPARE command is executed;

FIG. 11 shows the insertion of a partition;

FIG. 12 shows the newly inserted row;

FIG. 13 shows the newly added partition with its ending value set;

FIG. 15 shows a screen displaying seven rows of modifiable data, according to an embodiment of the present invention;

FIG. 16 shows the screen if the DDL is generated incorrectly;

FIG. 17 shows the screen with the correct DDL;

FIG. 18 shows the screen with the command MAX-VALUE;

FIG. 19 shows the screen of FIG. 18 after the ENTER key has been pressed;

FIG. 20 shows a screen with the keyword "MAX" entered into column RADIATION_LEVEL;

FIG. 21 shows the screen of FIG. 20 with the abbreviated value expanded;

FIG. 22 shows "MAX" being entered for partition seven;

FIG. 23 shows two additional keywords expanded;

FIG. 24 shows the "VALUES" command;

FIG. 25 shows the screen of FIG. 24 with all non-blank data fields restored to their ordinary default behavior and widths;

FIG. 26 shows the CMAX line command;

FIG. 27 shows the result of entering the CMAX line command;

FIG. 28 shows the SMAX line command;

FIG. 29 shows the result of entering the SMAX line command;

FIG. 30 shows another embodiment using the CMAX line command;

FIG. 31 shows the result of entering the CMAS line command;

FIG. 32 shows the SMAX primary command;

FIG. 33 shows the result of entering the SMAX primary command;

FIG. 34 shows PRO line command;

FIG. 35 shows the result after entering the PRO line command;

FIG. 36 shows the CMAX primary command for all columns;

FIG. 37 shows the result of entering the CMAX primary command for all columns.

Figure 14:
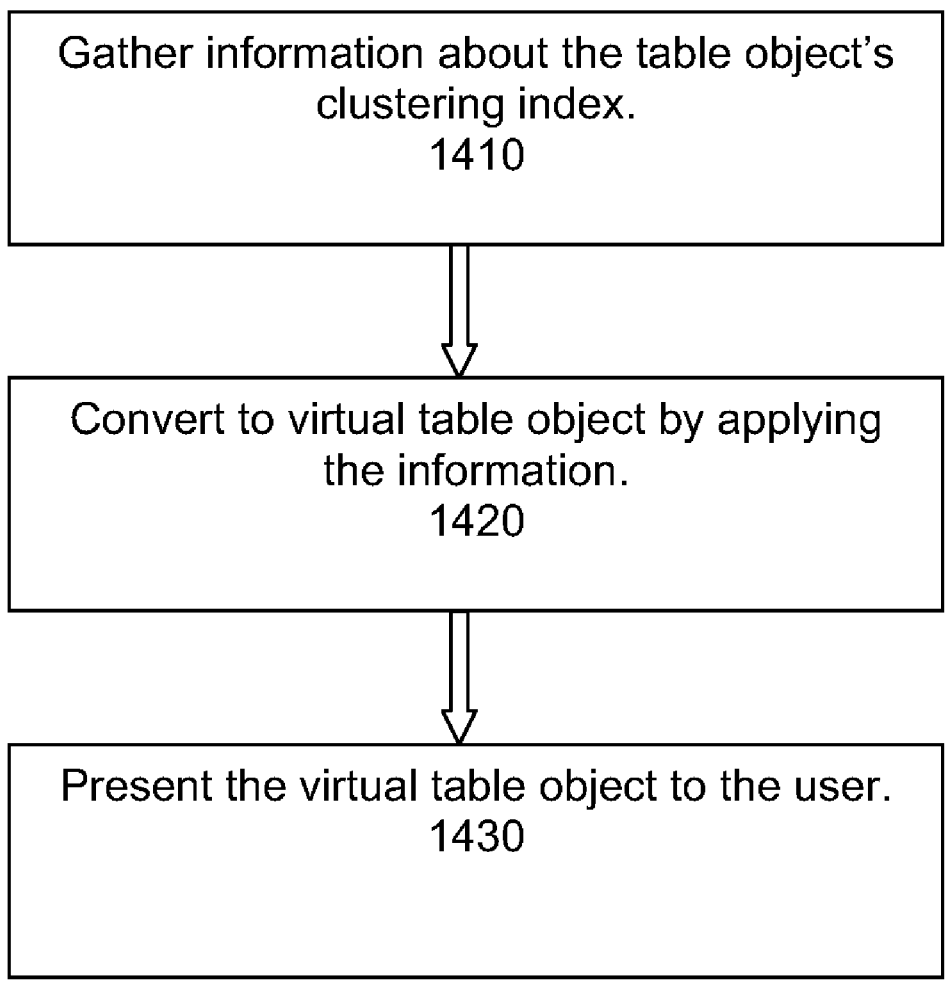
FIG. 14 is a high-level flow chart of a method for generating a pseudo-conversion of an object table, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method and apparatus to generate a pseudo-conversion of a table object so that it uses TCP instead of ICP (or visa versa) by inheriting and virtually applying to the table object the definition of its clustering index and allowing further virtual interactive management of the pseudo-converted table as if it were a real table using TCP without having previously generated the DDL (Data Definition Language) or first causing it to actually be converted to use TCP in the DB2 catalog. In performing a pseudo-conversion from ICP to TCP, or from TCP to ICP, there will be no difference whether the index is real or virtual. When converting from TCP to ICP, a virtual index can be implicitly created using the TCP's attributes that are relevant to making the ICP index, such as limit values, keys, and so forth. Also, the conversion from ICP to TCP should work with all virtual objects as well and they should not have to be all real.

Referring now to the drawings and to FIG. 14 in particular, there is shown a high-level flow chart of the method steps for virtually converting the object table, according to an embodiment of the present invention. First, in step 1410, this invention automatically looks up the clustering index (whether virtual or real) belonging to a partitioned table (whether virtual or real) that is using index-controlled partitioning (ICP) and in step 1420, it converts that table object into a virtual object that looks and behaves as if it were actually using table-controlled partitioning (TCP). Lastly, in step 1430 it presents the table as such to the user on interactive screens so that the table may be further viewed and managed as a table using TCP before actually generating DDL to cause the real conversion or having to physically convert the table before being able to view and manage it as a table object using TCP.

This is accomplished, in part, by gathering the necessary information from various sources in the DB2 catalog (and/or RC/Migrator strategy). An RC/Migrator strategy is a collection of data from both real and virtual sources that define all objects, virtually, so that they may be acted upon virtually without affecting the real objects in the DB2 catalog or requiring, to first exist as being real, objects that have not yet been defined in the DB2 catalog and that exist only virtually in the RC/Migrator strategy.

After gathering the necessary information it is virtually applied, in full or in part, to the table object definition that the user is viewing. A translation is always attempted, whether it can be done fully or partially. The extent of the translation is determined by:

If the table has a clustering index and is using index-controlled partitioning from which we can extract partitioning key and limits (ending value) information and apply it to the table object, thus translating the table's PTMALTER list from one that does not use or contain TCP information and nodes to one that is using (pseudo) TCP information and nodes and which also has a fully constructed underlying IX_alter structure, then a full pseudo conversion is performed.

If a full translation cannot be performed, because of alterations made to the table prior to the attempt to translate, then a partial translation is performed if possible.

If neither of the above is true, then no translation is performed and the user is notified; and, the user is required to choose the columns that are to compose the key for the table; and, if necessary, the user is automatically prompted to enter such values.

When this pseudo conversion occurs, it is necessary to isolate and differentiate that which belongs to the original table object that is being altered or templated and that which is not real and was inherited from, and belongs to, the table's clustering index, thus allowing the user to toggle between the pseudo-converted object and the real object with no conversions applied.

The screen in FIG. 1 shows the clustering index "DB2.NBIX0014" for table "DB2.NBTB0014" that is currently using ICP (Index-Controlled Partitioning.) This definition, which belongs to the index object only, is unique to the index. We show the different fields in different levels of grayscale.

Referring to FIG. 2, this screen shows the index's table object. Here, the table is still shown as using ICP with the partitioning option (formerly NO) having been overtyped with YES with the ENTER key not yet pressed.

When the ENTER key is pressed, the pseudo-conversion will take place. Entering the LIMITS or KEY commands on the primary command line, which are used for tables using TCP, will also cause a conversion to take place. (Described later, the LIMITS command causes the "Table Partitioning & Limit Key Values" screen to display; the KEY command causes the "Table Partitioning Key Column Sel & Maint" screen to display.)

The number of partitions in the table's tablespace is shown to the right of the partitioning option. This indicates, in FIG. 2, that the table resides in a partitioned tablespace with 73 partitions and may use either ICP or TCP, depending on the setting of the Partitioning option:

YES—Specifies that the table is a partitioning table that is defined to use TCP. If this option is NO, and the table is using ICP, and it is overtyped with YES, the table is pseudo-converted to look like it is using TCP on the screen. If this is all that is done, the DDL that is generated will cause the table to be converted to use TCP without dropping the clustering index.

NO—Specifies that the table is not a partitioning table. If this option is YES, and the table was originally using ICP, and it is overtyped with NO, the table is converted back to its original ICP definition and all pseudo-TCP definition information is discarded. If, however, this option is YES and the table was also originally using TCP, and it is overtyped with NO, the table is pseudo-converted to look like it is using ICP on the screen. Furthermore, if the table has a type-P clustering index defined, the DDL that is generated will also cause that index to be converted to a type-2 clustering index using the table's original TCP definition.

To the immediate right of the Partitioning option is an output-only "TS Parts" status field. This novel field provides important information to the user. This status field displays information about the table's tablespace, such as whether it is partitioned and its number of partitions. The values and indicators that can display in this field are:

integer—The tablespace is partitioned, where integer is the number of partitions in the tablespace.

NONE—The tablespace is not partitioned.

Unkn—the tablespace is not found or not defined and is assumed to be not partitioned.

Currently, on a Create of a new table object, the Partitioning option initially defaults to NO. Following are further descriptions that further describe how this invention works as currently implemented:

If the table uses ICP and this option is changed from NO to YES, the partitioning information from the table's clustering index is used for the table's partitioning key and limit values, in which case the "Table Partitioning Key Col Selection & Maint" screen does not automatically display if at least one key column and limit value is successfully applied from the table's clustering index.

If the table is not using ICP and this option is changed from NO to YES, as a convenience, the "Table Partitioning Key Col Selection & Maint" screen automatically displays; and, unless one or more key columns are selected, the Partitioning option is automatically reset to NO upon returning to the Table Alter, Create or Template screen.

When the Partitioning option is YES, use the KEY primary command to display the "Table Partitioning Key Col Selection & Maint" screen at any time.

If you want to create a partitioned table that uses TCP, the tablespace specified for the table must be partitioned and the TS Parts status indicator to the right of the Partitioning option should display an integer value showing the number of partitions in the tablespace. If the TS Parts status indicator does not show an integer value, RC/Objects assumes the tablespace to be not partitioned. You may still specify YES for the Partitioning option; however, doing so may cause bad DDL to be generated or the generated DDL may not successfully execute on the current subsystem.

When creating a new table that is not through the templating of an already existing table, the Partitioning option is initially set to, and displays, NO. In this document, we refer to templating as simply the method in which an already defined table (whether real and defined in the DB2 catalog or virtual and defined only in the RC/Migrator Strategy) can be used as a template for creating a definition for another table. The original table definition, and all its attributes, is inherited by the new table definition, so that the new table definition is initially a mirror copy of the original table definition that was used as a template.

Changing the Partitioning option from YES to NO causes an implicit delete of all of the table's partitioning key columns and limit values; and, depending on the index objects originally defined for the table, it will (or may not) be converted to use ICP according to the following rules and processes:

An automatic complete conversion of the table from TCP to ICP, complete with a type-2 clustering index defined for the table, does not occur if the table was originally defined as using TCP and does not also have a type-P clustering index defined on the table. Unless a type-2 clustering index is also defined for the altered table, the generate DDL will drop the table's tablespace and then recreate the table and its partitioned tablespace without TCP or ICP.

If, however, the table was originally defined as using TCP and also has a type-P clustering index defined on the same table, the generated DDL will drop the table's tablespace and then recreate the partitioned tablespace, the table and also recreate (i.e. redefined) the type-P clustering index as a type-2 clustering index using the table's original partitioning information for the type-2 index's key and limit values.

If the type-P clustering index's key is a superset of the table's partitioning key, the extra key columns are included in the re-definition of the index from a type-P to a type-2, but with no limit values specified for the extra columns in the generated DDL. For RC/Migrator strategies: If, in the same strategy, you create a new index or alter an existing index to be the type-2 clustering index for your table, it will be used instead.

Notwithstanding the above exception, if there are type-P and/or type-D indices on the table, DDL will be generated for recreating these objects; however, the DDL will not be able to be successfully executed and the objects re-created because the partitioning information, keys and limit values for the table will be lost and the table will no longer be using TCP after it is re-created using the generated DDL.

Additionally, when the table's partitioning key information is implicitly deleted by this method, subsequently changing the Partitioning option back to YES within the same session or strategy will not cause the deleted information to be automatically reinstated. Instead, the "Table Partitioning Key Col Selection & Maintenance" screen automatically displays so that you can specify new key columns.

If you want to reinstate the original partitioning information for the table without canceling and starting again, use the RESET command on the Table Alter or Template screen. This will reset the table object back to its original definition.

Referring to FIG. 3, after entering YES for the Partitioning option, as described for FIG. 2, and then pressing the ENTER key, the displayed table object is automatically pseudo-converted so that it looks like it is using TCP. Message RO435W is displayed at the top of the screen below the command line, notifying the user that the DDL that will be generated will cause the table to be converted to use TCP instead of ICP.

The third column, whose heading is "PS," now shows the Partitioning (key) Sequence number for each table column that is (i.e. will be) a member of the partitioning key. The Partitioning Sequence numbers of these columns now exactly match the key column sequence numbers (column SEQ#) of the table's clustering index shown in FIG. 1.

The table has not actually been converted. It simply displays to the user exactly how the table will look if it were to be converted to use TCP by the DDL that is yet to be generated. The description of the RO435W message explains in more detail what has and will happen:

RO435W is a warning message notifying you that you changed the Partitioning option on the Table Alter/Template screen from NO to YES and the table you are altering or templating was defined to use index-controlled partitioning; and, by changing the Partitioning option to YES, the partitioning key and limit values from your table's clustering index have been automatically applied to your table; and, if you choose to keep this change, DDL will be generated that will convert/create your table so that it uses table-controlled partitioning instead of index-controlled partitioning.

If you do not want your table to be converted to use table-controlled partitioning, you can enter the CANCEL or RESET command on the primary command line. Entering CANCEL will cancel the Table Alter/Template session, discard all of your changes and return you to the previous screen. Entering RESET will discard all of your changes without leaving the Table Alter/Template screen.

Note: When RC/Objects applies ICP attributes to your table in its effort to make it appear to be a table that is using TCP, the "original" names defining the table and its columns, its clustering index and key columns, the tablespace and database are used for matching. So, even though you may have altered the name of a table column or a key column in the clustering index, for example, and as long as the column has not been explicitly deleted from the table or index, the application of the clustering index's attributes to your table will still be performed by using the OLD names for matching columns between the table and index instead of using the NEW altered names. Additionally, this way, the original columns will still correlate between the table and the clustering index even if they happened to be rearranged.

It is important to note, however, that changes in data types, sizes and scales between the table and clustering index are not checked for compatibility prior to the application. The user may now optionally make further modifications to the table, just as if it were using TCP—even before it is actually converted to use TCP.

If this is all that is done, then a simple single TABLE ALTER statement is automatically generated, using method (5) to cause the table to be implicitly converted only, to use TCP instead of ICP when executed; also, causing the table's clustering index to be automatically and implicitly, converted to a type-P clustering index.

As mentioned for FIG. 2, entering the KEY primary command will also cause a pseudo-conversion of the table from ICP to TCP (if the Partitioning option is not already YES) and causes the screen in FIG. 4 to display. Because this screen is specific to tables using TCP, if the table is using ICP and the KEY command is entered, the presumption is that the user wants to convert the table to use TCP, so the conversion is automatically performed as a convenience to the user.

From this screen, the user can further modify the partitioning key columns for the table and continue working with the table and making modifications just as if it were a table using real TCP; including, deleting, inserting and rearranging the partitioning key's key columns and/or change their ascending/descending order.

FIG. 5 shows the same screen with the Hide option set to Y. This causes the unused selectable columns in the first scrollable list, shown in FIG. 4, to be hidden so as to provide more room on the screen for the actual partitioning key and all of its columns. Here, one can conveniently see all key columns without having to scroll the display. From this form of the screen, the user may delete and rearrange the partitioning key columns and/or change their ascending/descending order, only.

As mentioned for FIG. 2, entering the LIMITS primary command will also cause a pseudo-conversion of the table from ICP to TCP (if the Partitioning option is not already YES) and causes the screen in FIG. 6 to display. Because this screen is specific to tables using TCP, if the table is using ICP and the LIMITS command is entered, the presumption is that the user wants to convert the table to use TCP, so the conversion is automatically performed as a convenience to the user.

The Table Partitioning & Limit Key Values screen allows you to individually manage all of your Table's partitions and limit values on one screen using one convenient scrollable list. From this screen, you can easily add, copy, move, repeat, delete and rotate partitions; and, modify limit values for one column for a single partition, or all columns for all partitions. You can also re-arrange limit values amongst partitions in several ways, including the ability to exchange (or swap) values between partitions or replicate values in one or more columns through two or more partitions.

The limit values for each column in the partitioning key are arranged horizontally across the screen. The partitions are arranged vertically, with one row for each partition in your table. You scroll UP and DOWN through the partitions using the PF7/8 keys. If all columns in your table's partitioning key do not all fit on the screen at one time, you may scroll the display LEFT and RIGHT using the PF10/11 keys to see the other key columns.

When the Table Partitioning & Limit Key Values screen is either automatically displayed, or otherwise explicitly displayed by entering the LIMITS command on the primary command line on the CA DB2 Table Alter, Create or Template screens, all limit values are placed in an unprotected state by default; and, you can specify the maintenance mode to which you want the display to default (restricted to the VALUES ONLY or PARTITIONS modes) with the SaveSettings command. In VALUES ONLY and PARTITIONS modes, any value may be directly (with the exception of MINVALUE and MAXVALUE,) or indirectly modified throughout any of the table's partitions. There are three maintenance modes in all.

The VALUES ONLY mode allows you to manage the limit values for your partitions, such as setting, clearing, repeating, copying, re-arranging and exchanging limit values between partitions independent of the logical arrangement or ordering of the partitions.

The PARTITIONS mode, in addition to managing limit values, allows you to manage partitions, such as adding, copying, moving, repeating, deleting and rotating partitions.

The MAXVALUES mode, allows you to directly manage MINVALUE and MAXVALUE settings for any key column in any partition without having to use commands.

To switch modes, use the VALUES, PARTITIONS and MAXVALUES primary commands. You can ROTATE FIRST TO LAST in any mode with the ROTATE primary command. This is the only partition management command that is available in all modes.

If you want to protect partitions or columns from direct keyed input or from data-altering commands while in VALUES ONLY or MAXVALUES modes, you may do so with the PROTECT primary and PRnn line commands. (Note: This values management feature is not available in PARTITIONS mode.)

If you make changes to your limit values and then wish to discard them and return to the previous screen, you can do so by entering the CANCEL command. All of your changes, up to the point of the last implicit or explicit SAVE, will be discarded and you will be returned to the previous screen.

In FIG. 7, the ROTATE command is entered, causing the first partition to be rotated so that it is the last partition. Every operation that is performed in this table now is as though it were a real TCP table.

FIG. 8 shows the screen after the rotate command is executed. The first partition is rotated so that it is the last partition, and all of its ending values automatically blanked out for the user so that it is ready for the user to define the new ending values that are required for the rotation.

Here, the SMAF command is being entered, which sets only the first blank key column's ending value to MAXVALUE while leaving all the other key columns for the partition unchanged. The MAXVALUE field will be explained in detail in the discussion pertaining to FIGS. 15-37.

So we can see what has happened in the background, FIG. 9 shows the COMPARE command being entered, which causes the screen to show the OLD and NEW (BEFORE and AFTER) affects of the partitions after entering the ROTATE command and new ending value for the rotated partition, as shown in FIG. 10. The lines marked with "OLD" denote the protected fields that do not accept user input.

Here, in FIG. 10, we can see that the last partition (PART 73) was previously the first partition (PART 1) as illustrated by the line with OLD to its left. This is exactly what DB2 will do to the table's tablespace's logical partition numbers when the rotate is executed using the DDL that will be generated. Now, the user can see exactly what DB2 will do, before it is actually done.

If this is all that is done, then a simple single TABLE ALTER statement is automatically generated, using method (6) to cause the table to be rotated using the newly specified ending values for the rotated partition, thus causing the table to be implicitly converted to use TCP instead of ICP when executed; also, causing the table's clustering index to be automatically, and implicitly, converted to a type-P clustering index.

Assuming that we had not done a rotate, FIG. 11 demonstrates inserting (or adding) a partition. The "I" line command is entered, and the Enter key is pressed. This causes a new blank (74$^{th}$) row to be inserted into the list of 73 partitions, as shown in FIG. 12.

FIG. 13 shows the newly added partition (PART 74) with its ending value set.

If this is all that is done, then a simple single TABLE ALTER statement is automatically generated, using method (7) to cause the newly inserted partition to be added to the table, thus causing the table to be implicitly converted to use TCP instead of ICP when executed; also, causing the table's clustering index to be automatically, and implicitly, converted to a type-P clustering index.

Without this invention, it is not otherwise possible to preview the table and all of its attributes inherited from its clustering index prior to causing it to be converted to use table-controlled partitioning instead of index-controlled partitioning; or, to further, and conveniently, view, manage and make additional modifications to the table object, its partitions, partitioning keys and/or key column ending values, as if it were actually using TCP already, prior to committing the changes and generating the DDL to cause such a conversion and additional changes to take affect and applied upon executing the generated DDL.

The general architecture of the method as described is not specific to any computer language or hardware architectural platform.

MAXVALUE and MINVALUE.

MAXVALUE and MINVALUE are reserved keywords, designating by the three-character value "MAX" and "MIN," respectively. As reserved keywords, they are treated differently than ordinary data entered by a user. Ordinary data is any string of binary data of any length representing printable or non printable characters, tokens, numeric values, forms, documents, or elements within documents such as XML, excluding reserved keywords.

Using reserved keywords has two advantages: 1) data may continue to be entered in WYSIWYG (What You See Is What You Get) form without the need to enter special characters or attributes or place the data in a wrapper (quotes, apostrophes) in order to distinguish from data vs. keywords; and 2) because data may be entered in WYSIWYG form, there is a significant savings of space which is ideal for applications and devices where space on a display is at a premium or simply not available.

This approach may also be augmented further, by prompting the user for how a field is to be interpreted if data is ambiguous because it can be interpreted as either ordinary data or a recognizable keyword.

On some data-entry type screens, such as IBM®'s ISPF (Interactive System Productivity Facility) interface, the same, using this invention, may also be accomplished by combining the placement of the computer cursor on a field with the press of a function key to change how data entered into a specific field is to be interpreted (as ordinary data or as a keyword); or, by entering a command and then placing the cursor on a field before pressing the Enter key; or, by combining a primary command or line command in conjunction with the data entered in a field that is sensitive to special reserved keyword identifiers before pressing the Enter key so as to indicate that the newly keyed in data is to be treated as a directive and not as data when entered into a field on the screen that would otherwise be, by default, interpreted as data that is to be stored, sent or re-displayed.

The implementation of the MAXVALUE and MINVALUE keywords provides a means to cause the behavior of fields, and the data contained therein, to subsist as keyword fields and reserved keyword identifiers indefinitely until which time the fields or their data are again acted upon or otherwise explicitly modified so as to change how the data is to be interpreted—either as ordinary data or a keyword.

By entering the keyword and identifying it as such, the program internally, permanently or temporarily, alters the normal or defaulted meaning and behavior of the field so as to support the keyword and provide new meaning as to how that field is to be handled when performing subsequent tasks, such as when it is time to generate the DDL statement.

Additionally, so that the data entered into the field may not be mistaken for ordinary data and so that when other commands and functions are exploited that are global in nature that are normally used against ordinary data, the field is protected against inadvertent changes unless the user specifically requests that the meaning of the data in the field is to be interpreted as ordinary data and no longer interpreted as a keyword through the use of line commands, primary commands and/or a change in screen/display mode.

Setting MIN/MAXVALUE using MAXVALUES mode.

Referring to FIG. 15, there is shown a screen displaying seven rows of modifiable data, numbered 1 through 7, with the leftmost column of vertical fields, with heading CMND, in which line commands may be entered; and, three additional columns with the headings RADIATION_LEVEL, SAMPLE_COUNT and AM_PM in which ordinary data may be entered. This data may be stored into a database, a data file, transmitted, and so on. For this example, this data is stored into a database catalog by means of generating DDL statements that are interpreted by the database subsystem. These statements, when read and interpreted by DB2, allow a database administrator to create, alter and drop database objects and their definitions in the database's catalog.

In order to know how these statements are to be generated, data is entered by the administrator on screens, such as that shown in FIG. 15. With these screens, the administrator is able to specify exactly how the object is to be defined. This data is then used to determine exactly how the necessary DDL statements are to be generated and what clauses are to be included so that the object is created or altered to the administrator's exacting specifications.

In FIG. 15, the data MAXVALUE in rows 6 and 7 for column RADIATION_LEVEL has been entered and is subsequently interpreted as ordinary data; however, because the data MAXVALUE is also a reserved keyword that also has special meaning to DB2, and because it is desired that the MAXVALUE for row 7 is to be interpreted as such and not as ordinary data, a method is necessary for differentiating between the two strings so that the program generating the DDL for DB2 generates the statement correctly. Without being able to make such a distinction, the DDL will be generated incorrectly, as shown in FIG. 16, instead of being generated as expected as is shown in FIG. 17.

The difference between the two sets of DDL is that in FIG. 16, MAXVALUE for PARTITION 7 is wrapped in quotes, which tells DB2 that the string is to be interpreted as ordinary data (or literally); while, in FIG. 17, MAXVALUE for PARTITION 7 is not quoted, which tells DB2 that it is not to be interpreted as a literal string, but rather as a keyword (or control) that has a substantially different meaning and causes a unique value to be stored internally into the DB2 catalog that has a special meaning different than that of the literal string 'MAXVALUE' (wrapped in quotes for PARTITION 6).

Referring to FIG. 18, we blank out the value in row 7 (so it has no assigned value that can be misinterpreted), then enter the command MAXVALUES on the primary command line, and then press the Enter key. This is how we enable the entering of data that the system recognizes as a keyword, instead of as ordinary data, within the same field on the same screen without the need to enter additional identifying attributes.

FIG. 19 shows the screen as it looks following the pressing of the Enter key. Its look is altered and the Maintenance Mode now displays MAXVALUES.

When the screen is in Maintenance Mode MAXVALUES, all data fields are changed so that they are protected and no data can be entered; and, all fields that contained no data, and were blank, remain so; however, all such empty fields that were wider than three characters are now narrowed to three characters, and fields that were narrower than three are increased to three characters. The reason for this is because the behavior of these fields is now modified such that they will only accept values that correlate to reserved keywords that are recognizable by DB2 and that are acceptable as such when inserted directly, as is, into generated DDL.

Because only three characters are required for the program to differentiate between the only valid and acceptable keywords MAXVALUE and MINVALUE, the fields have been made only three characters wide; however, after the first three unambiguous characters of a recognizable keyword are entered into a field, it is automatically expanded and its abbreviation substituted with the full keyword, as is shown in the next two figures, FIG. 20 and FIG. 21.

Referring to FIG. 20, the keyword "max" is entered into column RADIATION_LEVEL for PARTITION 7 (on the $7^{th}$ row). Referring to FIG. 21, after entering the keyword "max" into column RADIATION_LEVEL for PARTITION 7 on the $7^{th}$ row and pressing the Enter key, the abbreviated value is automatically, and conveniently, expanded to its full recognizable keyword value.

To further demonstrate, suppose that the administrator decided that (s)he wanted to explicitly specify MAXVALUE for all of the $7^{th}$ partition's key columns. FIG. 22 shows "max" being entered for the $7^{th}$ partition's remaining two columns; and, FIG. 23, below, shows these two addition keywords expanded, as was the first column, after the Enter key is pressed.

Referring to FIG. 24, we leave the MAXVALUES Maintenance Mode and return to the VALUES ONLY mode by entering the command "VALUES" and then pressing the Enter key.

When the screen is returned to Maintenance Mode VALUES ONLY, as shown in FIG. 25, all non-blank data fields (i.e. fields that contain data but do not contain an explicitly identified reserved keyword) are restored to their ordinary default behavior and widths; and, they are no longer protected so that ordinary data may again be entered into any of these fields, while at the same time, all fields in which reserved keywords were defined when in MAXVALUES mode are now protected so that no data may be directly keyed into any of these fields.

Clearing/Setting MIN/MAXVALUE using Line commands outside of MAXVALUES mode.

Several new line commands were invented to allow the indirect setting and clearing of the MAXVALUE and MINVALUE keywords for one or more rows (partitions) without the need to be in MAXVALUES mode:

CMAX—Explicitly clear all unprotected occurrences of MAXVALUE for this partition to blanks.

CMIN—Explicitly clear all unprotected occurrences of MINVALUE for this partition to blanks.

SMAX—Explicitly set all unprotected limit values for this partition to MAXVALUE.

SMAB—Explicitly set all unprotected blank limit values for this partition to MAXVALUE only.

SMAF—Explicitly set only the first unprotected blank limit value for this partition to MAXVALUE.

SMIN—Explicitly set all unprotected limit values for this partition to MINVALUE.

SMIB—Explicitly set all unprotected blank limit values for this partition to MINVALUE only.

SMIF—Explicitly set only the first unprotected blank limit value for this partition to MINVALUE.

For example, FIG. 26 shows the CMAX line command being entered for the $7^{th}$ partition, which causes only those fields in that row to be cleared if the MAXVALUE keyword is present. If this line command is entered for the 6th partition, nothing happens; because the MAXVALUE in column RADIATION_LEVEL is ordinary data and not a keyword (see FIG. 30 and its accompanying description.) Note: As an added convenience, these commands may also be used when in other modes, such as MAXVALUES mode.

FIG. 27 shows the result of entering the CMAX line command, as described earlier for FIG. 26, after pressing the Enter key. All MAXVALUE keywords are cleared and replaced with blanks and the fields returned to their ordinary default behavior so that ordinary data may again be entered into any of these fields.

FIG. 28 and FIG. 29 demonstrate the SMAX line command. The two figures, FIG. 30 and FIG. 31, demonstrate entering the CMAX line command for a partition that contains a mixture of column behaviors, with the first column's behavior set to accept and interpret any data as ordinary data and the last two columns set to the actual keyword MAX-VALUE.

Since this command is designed to target only fields that contain keywords and not to affect ordinary data that may happen to be identical to the pattern of a reserved keyword, the command bypasses the ordinary data and clears only the fields that contain an actual keyword.

Clearing/Setting MIN/MAXVALUE using Primary commands outside of MAXVALUES mode.

Several new Primary commands were invented to allow the indirect setting and clearing of the MAXVALUE and MIN-VALUE keywords for one or more columns without the need to be in MAXVALUES mode:

ClearMAX—Clear MAXVALUE from all partitions for the specified columns

ClearMIN—Clear MINVALUE from all partitions for the specified columns

SetMAX—Set all partitions for the specified columns to MAXVALUE

SetMIN—Set all partitions for the specified columns to MINVALUE.

For example, FIG. 32 shows the SETMAX primary command (abbreviated here as SMAX) being entered for key columns SAMPLE_COUNT and AM_PM, which causes all fields for those columns to be unconditionally set to MAX-VALUE for all partitions. Note: As an added convenience, these commands may also be used when in other modes, such as MAXVALUES mode.

FIG. 33 shows the result of entering the SETMAX primary command, as described earlier for FIG. 32, after pressing the Enter key.

The purpose of the following figures is to demonstrate how protected data fields influence the behavior of the line- and primary-commands used for clearing and setting MAX-VALUE and MINVALUE. A protected field, as compared to one that is protected because it is set to a keyword value, for example while the screens maintenance mode is other than MAXVALUES, is one that disallows its contents to be changed by direct keyed input or by any primary or line command that may directly or indirectly alter its contents or value. For example, the PRO (PROtect) line command, as shown in FIG. 34 and FIG. 35, causes all key columns for the partition beside which it is entered to be protected. This may be indicated on a display screen by its color being changed, regardless of whether or not the field contains ordinary data, an explicit keyword or is blanks. Other change indicators may also be used within the spirit and scope of the invention.

Now, in FIG. 36, we enter the CLEARMAX primary command (abbreviated CMAX) for all columns. (Note: Specifying the asterisk (*) in place of an actual column name signifies all columns.) FIG. 37 shows the end result. Notice also the warning message (RO290W) notifying the user that not all values could be altered because some were protected. As long as these fields remain explicitly protected, they cannot be intentionally or accidentally modified—even if the screen's mode were changed to MAXVALUES.

Prior systems typically accomplish the task of recognizing and differentiating between ordinary data and reserved keywords and directives by requiring that ordinary data be wrapped in quotation marks, apostrophes or other matching special delimiters, as is required by DB2 in DDL (see FIGS. 15, 16, and 17 and accompanying descriptions); or by providing, for example, separate mechanical pre-defined or programmable buttons that have special meaning as to the specific function or operation that is to be performed against or using the data that was entered, such as is commonly used on calculators and other hand-held devices; or, separate checkboxes, radio buttons, drop-down text boxes and the sort as used on "windows" based computer operating systems using a GUI (Graphical User Interface) that may modify the behavior of an otherwise regular text box.

Identifying data as ordinary data instead of a reserved keyword by wrapping it in quotation marks or apostrophes, for example, requires more space as well as the explicit entry of additional data (the wrapper,) which may be impractical when space on a the display is limited, as is common with small handheld devices with small displays; and, doing such requires additional unnecessary keystrokes or button entries on a keypad. Also, using separate mechanical pre-defined or programmable buttons, or check-boxes and the sort may not be convenient or may be impractical because of the lack of such support for the platform, or for the kind of device, or because of its size where additional buttons, the use of a stylus or other addition gadgetry is impractical or not a viable solution.

Figure 38:
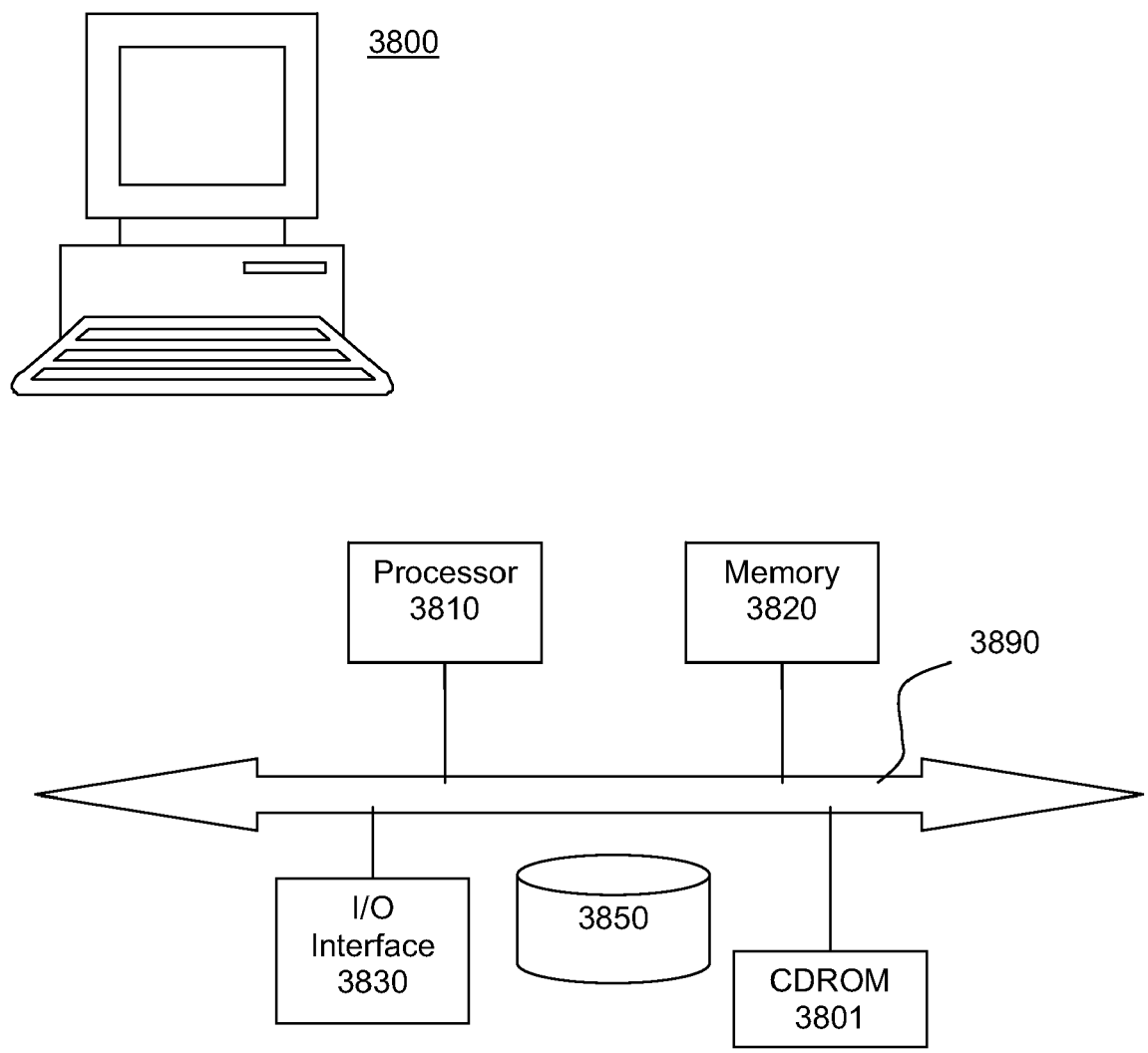
FIG. 38 shows a simplified block diagram of a system configured to operate according to an embodiment of the present invention.

Referring to FIG. 38 there is shown a highly-simplified illustration of an information processing system 3800 configured to operate according to an embodiment of the present invention. For purposes of this invention, computer system 3800 may represent any type of computer, information processing system or other programmable electronic device, including a client computer, a server computer, a portable computer, an embedded controller, a personal digital assistant, and so on. The computer system 3800 may be a stand-alone device or networked into a larger system.

The system 3800 includes a number of components, such as a processor 3810 operatively connected with a memory 3820, and an input/output (I/O) subsystem 3830. The system 3800 will also contain any number of operators and peripheral devices common to computing systems.

The processor 3810 may be a general or special purpose microprocessor operating under control of computer program instructions executed from memory 3820. The processor 3810 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in memory 3820 that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory 3820 may be partitioned or otherwise mapped to reflect the boundaries of the various memory subcomponents.

The memory 3820 represents either a random-access memory or mass storage. It can be volatile or non-volatile. The system 3800 can also comprise a magnetic media mass storage device such as a hard disk drive 3850.

The I/O subsystem 3830 may comprise various end user interfaces such as a display, a keyboard, and a mouse. The I/O subsystem 3830 may further comprise a connection to a network such as a local-area network (LAN) or wide-area network (WAN) such as the Internet. Processor 3810 and memory 3820 components are physically interconnected using conventional bus architecture 3890.

According to an embodiment of the invention, a computer readable medium, such as a CDROM 3801 can include program instructions for operating the programmable computer 3800 according to the invention. What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of media include ROMs, DVD-ROMs, and transmission-type media, such as digital and analog communication links, wired or wireless communications links using transmission forms, such as, for example, radio frequency and light wave transmissions. The media make take the form of coded formats that are decoded for use in a particular data processing system.

This invention may be easily adapted to hand-held or portable devices: Prompting is especially useful for small handheld devices, such as cell phones, which would otherwise require (non-intuitive) complex or multiple fields, screen displays, etc. Alternatively, the device can "walk" or "guide" the user through using friendly intuitive methods—prompting the user for appropriate responses or programmed to anticipate (learning the -end-user's habits and behaviors) the most commonly used keyword identifiers and defaulting as such by default so as to minimize the questioning and prompting. This can be done by auto-generating the data in the fields. This provides for a more user friendly and intuitive interface and a more pleasant experience for a user. Otherwise, a longer learning curve is required if the same were used with multiple other specialized fields and/or screens for each possible scenario or behavior that would be required for each keyword that may be entered in addition to ordinary data when one or multiple like or differing fields are simultaneously displayed or maintained in either the foreground or background.

When using less definitive means of entering data and commands where the user is more detached from the electronic or computing device, there is a further need for the user to be able to easily indicate and the computer or device to recognize obscurity or ambiguous entries that may have multiple meanings and to delineate and confirm, either though solicitation or for the user to indicate using more explicit means, whether data is to be interpreted as a function, command or simply as ordinary data.

The general architecture and concept of this invention is not specific to any computer language or hardware architectural platform. Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method for converting a table object from a first partitioning type to a second partitioning type, the method comprising steps of:
   automatically gathering information comprising a definition of a clustering index of the table object of the first partitioning type and attributes of said table object inherited from its clustering index, wherein said information is automatically gathered from a data store comprising real and virtual object definitions;
   generating a virtual table object of the second partitioning type by applying the gathered information to a clustering index of the virtual table object, such that the virtual table object represents how the table object will appear with partitioning type conversions applied;
   wherein the table object is not changed until the conversions are applied; and
   presenting the virtual table object to a user for viewing and manipulating as the second partitioning type, such that the user is able to toggle between the table object of the first partitioning type and the virtual table object of the second partitioning type before converting the table object to said second partitioning type.

2. The method of claim 1 wherein the first partitioning type is index-controlled partitioning and the second partitioning type is table-controlled partitioning.

3. The method of claim 2 wherein the virtual table object is presented on interactive screens.

4. The method of claim 2 further comprising:
   receiving a reset command from the user; and
   reinstating the table object to the first partitioning type in response to the reset command.

5. The method of claim 1 wherein generating an explicit conversion comprises steps of:
   generating a data definition language consistent with the second partitioning type;
   applying the data definition language to the table object; and
   executing the generated data definition language for explicitly converting the table object to the second partitioning type.

6. The method of claim 5 wherein generating an explicit conversion further comprises:
   separating fields from the table object and the clustering index into two separate embodiments; and
   applying second partition type attributes to the table object, such that the user can toggle between the table object and the virtual table object.

7. The method of claim 6 wherein applying the second partition type attributes comprises matching original names defining columns from the table object to the clustering index.

8. The method of claim 5 wherein generating the explicit conversion comprises maintaining the clustering index.

9. The method of claim 5 wherein generating the explicit conversion comprises converting the clustering index into a type-2 clustering index.

10. The method of claim 1 further comprising:
receiving an instruction from the user wherein the instruction indicates a task to be performed to implicitly manipulate the virtual table object as if it were of the second partitioning type;
modifying the virtual table object in accordance with the instruction; and
presenting the modified virtual table object to the user.

11. The method of claim 10 wherein the instruction comprises a keyword for altering a default value of a field.

12. The method of claim 11 wherein modifying the virtual table object comprises altering the default value of the field upon receiving the keyword.

13. The method of claim 10 wherein modifying the virtual table object comprises at least one instruction selected from a group consisting of: deleting, inserting, copying, moving, repeating, and rearranging the partitioning key columns.

14. The method of claim 10 further comprising an initial step of auto-generating a default value such that the user can accept the auto-generated default value without having to enter the value.

15. The method of claim 1 wherein gathering the information further comprises storing the information.

16. A computer program product stored on a computer readable storage medium and comprising code that, when executed, causes a computer to convert a table object from a first partitioning type to a second partitioning type by:
automatically gathering information comprising a definition of a clustering index of the table object of the first partitioning type and attributes of said table object inherited from its clustering index, wherein said information is automatically gathered from a data store comprising real and virtual object definitions;
generating a virtual table object of the second partitioning type by applying the gathered information to a clustering index of the virtual table object, such that the virtual table object represents how the table object will appear with partitioning type conversions applied; and
wherein the table object is not changed until the conversions are applied; and presenting the virtual table object to a user for viewing and manipulating as the second partitioning type, such that the user is able to toggle between the table object of the first partitioning type and the virtual table object of the second partitioning type before converting the table object to said second partitioning type.

17. The computer program product of claim 16 wherein the clustering index is a virtual clustering index.

18. An information processing system for converting a table object from a first partitioning type to a second partitioning type, the system comprising:
an input/output interface comprising a display for receiving input from a user and for presenting a virtual table object to the user;
a processor for converting the table object to a virtual table object by performing steps of:
automatically gathering information comprising a definition of a clustering index of the table object of the first partitioning type and attributes of said table object inherited from its clustering index, wherein said information is automatically gathered from a data store comprising real and virtual object definitions;
generating a virtual table object of the second partitioning type by applying the gathered information to a clustering index of the virtual table object, such that the virtual table object represents how the table object will appear with partitioning type conversions applied;
wherein the table object is not changed until the conversions are applied; and
presenting the virtual table object to a user for viewing and manipulating as the second partitioning type, such that the user is able to toggle between the table object of the first partitioning type and the virtual table object of the second partitioning type before converting the table object to said second partitioning type.

19. The system of claim 18 wherein the first partitioning type is table-controlled partitioning and the second partitioning type is index-controlled partitioning.

20. The system of claim 18 wherein the clustering index is a virtual clustering index.

* * * * *